US009505154B2

(12) United States Patent
Burger

(10) Patent No.: US 9,505,154 B2
(45) Date of Patent: Nov. 29, 2016

(54) MOLDING TOOL FOR BACK-MOLDING A PLASTIC FILM WITH A PLASTIC MELT

(75) Inventor: Harald Burger, Nuremberg (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 524 days.

(21) Appl. No.: 13/983,188

(22) PCT Filed: Feb. 8, 2012

(86) PCT No.: PCT/EP2012/000569
§ 371 (c)(1),
(2), (4) Date: Aug. 1, 2013

(87) PCT Pub. No.: WO2012/107222
PCT Pub. Date: Aug. 16, 2012

(65) Prior Publication Data
US 2013/0307186 A1 Nov. 21, 2013

(30) Foreign Application Priority Data
Feb. 10, 2011 (DE) .................. 10 2011 010 971

(51) Int. Cl.
B29C 45/14 (2006.01)

(52) U.S. Cl.
CPC ... *B29C 45/14262* (2013.01); *B29C 45/14065* (2013.01); *B29C 45/14016* (2013.01)

(58) Field of Classification Search
CPC .................. B29C 45/14262; B29C 45/14065; B29C 45/14016
See application file for complete search history.

(56) References Cited

U.S. PATENT DOCUMENTS

| 6,214,157 | B1 | 4/2001 | Spengler |
| 2005/0257998 | A1 | 11/2005 | Sato et al. |
| 2006/0188595 | A1 | 8/2006 | Furukawa et al. |
| 2006/0220274 | A1 | 10/2006 | Dooley et al. |
| 2007/0184148 | A1 | 8/2007 | Toyooka et al. |
| 2009/0142434 | A1* | 6/2009 | Tseng ............... B29C 45/14262 425/126.1 |

FOREIGN PATENT DOCUMENTS

| DE | 19733800 A1 * | 2/1999 | ............. A47G 23/06 |
| DE | 102006014893 | 10/2006 | |
| EP | 1614516 | 1/2006 | |
| JP | 2059307 | 2/1990 | |

(Continued)

OTHER PUBLICATIONS

Database WPI, Week 199749, Thomas Scientific, London, GB AN 1997-531432 XP002675194.

*Primary Examiner* — Robert B Davis
(74) *Attorney, Agent, or Firm* — Hoffmann & Baron, LLP

(57) ABSTRACT

The invention relates to a mould (1) for back-injection of a plastic film (4) with molten plastic, and a corresponding process for producing a plastic moulded article in the cavity (11) formed by a first and second mould part (2, 3). The first mould part (2) has a decorating surface zone (21), a clamping surface zone (22) arranged outside of the latter, and a recessed zone (23) arranged at least outside of the decorating surface zone (21). The second mould part (3) has an inlet (31) for the molten plastic and a projecting zone (33). The projecting zone (33) is arranged so that, when the tool is closed, it engages with the recessed zone (23), in order to hold the plastic film (4) arranged between the first mould part (2) and the second mould part (3), lying on the clamping surface zone (22) of the first mould part, in the recessed zone (23) under tension.

16 Claims, 4 Drawing Sheets

(56) References Cited

FOREIGN PATENT DOCUMENTS

| | | |
|---|---|---|
| JP | H02158315 | 6/1990 |
| JP | H04339613 | 11/1992 |
| JP | 05096574 | 4/1993 |
| JP | 9254185 | 9/1997 |
| JP | 11005230 | 1/1999 |
| JP | 2001096994 | 4/2001 |
| JP | 2004276280 | 10/2004 |
| JP | 2005088315 | 4/2005 |
| WO | WO 9609155 A1 * | 3/1996 ......... B29C 45/1418 |

* cited by examiner

MOLDING TOOL FOR BACK-MOLDING A PLASTIC FILM WITH A PLASTIC MELT

This application claims priority based on an International Application filed under the Patent Cooperation Treaty, PCT/EP2012/000569, filed on Feb. 8, 2012, and German Application No. DE 102011010971.4-16, filed on Feb. 10, 2011.

BACKGROUND OF THE INVENTION

The invention relates to a mould for back-injection of a plastic film with molten plastic. The mould has a first mould part and a second mould part. Furthermore, the invention also relates to a corresponding process for producing a plastic part, and plastic parts produced with the mould according to the invention or produced with the production process according to the invention.

A mould for back-injection of a plastic film with molten plastic and an associated production process are known from US 2006/0188595 A1, wherein for IM (in-mould) decorating of the plastic moulded article, a plastic film with a decorating layer is held in place in the first mould part by suction for exact positioning.

EP 1 614 516 A1 describes a mold for back-injection of a plastic film with molten plastic with a concave decorating surface zone, wherein a fixing frame is provided for fixing the plastic film.

A device with a similar mold is described in XP002675194/JP 9 254185 A. The mold has a convex decorating surface zone.

The object of the present invention is to provide an improved mould.

SUMMARY OF THE INVENTION

The mould according to the present invention is a mould for back-injection of a plastic film with molten plastic. This mould comprises a first mould part and a second mould part. With the mould closed, the mould cavity is formed between the two mould parts.

The first mould part comprises a decorating surface zone and a clamping surface zone arranged in the region of the outer edge of the decorating surface zone. In addition, this first mould part comprises a recessed zone which is arranged within the clamping surface zone and/or in the outer edge of the clamping surface zone or externally at a distance from the outer edge of the clamping surface zone. The second mould part comprises an inlet for the molten plastic and a projecting zone which is provided for engaging in the recessed zone of the first mould part. The inlet in the second mould part is preferably configured as inlet channel.

For back-injection of the plastic film, the plastic film is inserted between the two mould parts, in such a way that it is clamped through interaction of the clamping surface zone and recessed zone of the first mould part with the projecting zone of the second mould part. For this purpose it is provided according to the invention that the projecting zone of the second mould part is arranged so that, when the tool is closed, it engages in the recessed zone of the first mould part. Therefore the plastic film arranged between the first mould part and the second mould part, lying at least on the clamping surface zone of the first mould part, is entrained into the recessed zone of the first mould part, under tension of the plastic film, and is held there.

With this mould according to the invention, it is essential that the plastic film inserted in the mould for back-injection, lying on the clamping surfaces, is held tensioned above the decorating surface in the tool when the molten plastic is allowed to enter the cavity via the inlet into the mould, which is preferably preheated to about 30° C. to 70° C. As a result, wrinkle-free decorating of the plastic moulded article is obtained in the region of the decorating surface, because, owing to the flat, smooth placement of the film on the clamping surfaces and the simultaneous tensioning of the plastic film on the decorating surface, the plastic film can remain wrinkle-free during back-injection even though the thermoplastic plastic film is softened by the hot (preferably about 200° C. to 300° C.) molten plastic. When the clamping surface zone directly abuts the outer edge of the decorating surface zone, wrinkle-free decoration becomes possible over the entire decorating surface zone right up to the outer edge of the decorating surface zone.

The clamping of the plastic film inserted in the mould is ensured by forming a recessed zone in the first mould part and a projecting zone in the second mould part, which come into mutual engagement automatically when the tool is closed, by bringing together the two parts of the tool, so that the interposed plastic film, i.e. located between recessed zone and projecting zone, is entrained by the projecting zone into the recessed zone, preferably in the manner of a drawing operation. The recessed zone is preferably formed directly in the first mould part as a recessed channel or a recess of some other form. The projecting zone is also preferably formed directly in the second mould part, preferably by a raised area continuous with the surface of the mould. The recessed zone is preferably formed as a groove-shaped channel and the projecting zone preferably as a bar-shaped raised area. The recessed zone is arranged in the first mould part and the projecting zone is arranged in the second mould part preferably directly in the region of the outer edge of the clamping surface zone or at a small distance from the outer edge of the clamping surface zone. However, an arrangement directly within the clamping surface zone is also possible. The recessed zone of the first mould part and the projecting zone of the second mould part form an interlocking engaging device, with which the interposed plastic film is clamped by entrainment.

The projecting zone can also be formed from one or more materials different from the material of the mould. For this it is advantageous if the projecting zone is inserted as a separate part in a groove-shaped channel similar to the recessed zone, and is held therein by non-positive locking and/or by positive locking. The projecting zone can for example consist of a metal, such as e.g. copper or brass, or of plastic or rubber. The projecting zone can also consist of a composite material or have several layers, in particular it can have a surface coating. A comparatively soft material can be advantageous, so that there is less severe mechanical stress on the plastic film. Rubber or a projecting zone coated with rubber or silicone or similar material can be advantageous, to provide particularly good grip on the plastic film and improve the entrainment described above. Depending on the form of the surface of the plastic film facing the projecting zone, for certain applications, for example with a comparatively rough surface of the plastic film facing the projecting zone, it can be advantageous if the surface of the projecting zone is particularly smooth and slippery, and for example has a Teflon coating.

The projecting zone and the recessed zone interacting with it can completely surround the decorating surface or can be divided into partial zones by breaks. However, individual elements are also possible. For example, the projecting zone can be in the form of a lug or a peg and the recessed zone can be in the form of a recess with a corresponding reciprocal shape, e.g. in the form of a cup. It is advantageous if the projecting zone and the recessed zone have a continuous radius or radii, in order to achieve uniform tensioning of the plastic film during mould closure, wherein the plastic film is tensioned and entrained uniformly. For special requirements and depending on the surface finish and/or thickness of the plastic film, specially profiled projecting zones and/or recessed zones can also be advantageous, for example with continuous radii (coarse structure), on which smaller entraining elements (fine structure) are arranged, e.g. rough partial areas, small spikes or similar.

To achieve particularly effective tensioning of the plastic film, it is preferably provided that the mould has a fixing device by which the plastic film to be back-injected can be held in place on the first mould part, lying on the clamping surface zone of the first mould part. This fixing can take place for example by mechanical clamping of the film and/or by being held in place by vacuum suction. Holding the plastic film in place on the first mould part ensures that, when the tool is closed, the engagement of the projecting zone of the second tool part in the recessed zone of the first tool part tensions the plastic film into a wrinkle-free arrangement.

For this, it can be provided that the fixing device surrounds the recessed zone of the first mould part at least on two opposite sides. It can be provided that the fixing device is arranged [at a distance] from the clamping surface zone of the first and/or second mould part and outside of the cavity.

Preferably the fixing device is arranged only in sections or completely surrounding the recessed zone of the first mould part. Moreover, it is possible for the fixing device to be formed as a fixing hoop or fixing frame.

It is possible for the fixing device to be formed by parts of a transfer device of the plastic film and/or to be formed as a pressing device supported on the first or on the second tool part.

In preferred embodiments the clamping surface zone of the first mould part is arranged completely encircling the decorating surface zone. However, embodiments are also possible in which the clamping surface zone of the first mould part is only arranged in sections around the decorating surface zone. The completely surrounding arrangement ensures a uniform tensioning of the plastic film during back-injection in the plastic tool.

For the configuration of the clamping surfaces of the clamping surface zone and the configuration of the projecting and recessing device, the following preferred embodiments have proved useful:

Preferably the clamping surface zone of the first mould part is formed as a strip-shaped surface. The strip-shaped formation promotes the sealing of the cavity and ensures that the plastic film is wrinkle-free in the decorating surface zone.

In particular it can be provided that the recessed zone of the first mould part is arranged only in sections or completely surrounding the decorating surface zone and/or the clamping surface zone of the first mould part. In the arrangement of the recessed zone and projecting zone, it is essential that the plastic film can be tensioned uniformly in the decorating surface zone.

Preferably the projecting zone of the second mould part is arranged so that it coincides with the recessed zone of the first mould part.

In preferred embodiments the recessed zone of the first mould part is formed as a recessed channel and the projecting zone in the second mould part is formed as a complementary projecting bar.

Preferably the second mould part has a clamping surface zone. With the tool closed, the clamping surface zone is arranged so that it coincides with the clamping surface zone of the first mould part.

An essential objective in the back-injection of the plastic film is to obtain a moulded article [which has] decoration with the plastic film up to the outer edge of the surface of the moulded article provided for this. A further aim is that the moulded article has a sharp edge and the decoration extends up to the sharp edge and ends exactly in the edge zone. In this case embodiments should be possible in which the edge is formed as an angular edge, preferably right-angled, and is formed completely or largely without any rounding in the edge zone.

Particularly preferred embodiments of the mould provide that the second mould part forms a mould face in the cavity. This mould face forms an angular edge with the decorating surface. The edge is formed completely or largely without rounding. This makes it possible to produce decorated plastic moulded articles with sharp boundary edges. Preferably the second mould part forms, in the cavity, a mould face that is contiguous with the decorating surface in a commonly aligned surface.

In particular, the clamping surface zone of the first mould part can form sealing surfaces with an opposing surface of the second mould part, with the plastic film interposed, i.e. located in between, when the tool is closed. This can prevent escape of the molten plastic from the cavity between the first and second mould part during the operation of back-injection of the plastic film with the molten plastic.

The production process according to the present invention provides the production of a plastic moulded article, which has a surface decorated with a plastic film and achieves the configuration features discussed above. The production process provides, as process steps that follow one another directly or also follow one another with further interposed process steps:

Step a): arranging the plastic film (4) on the first mould part such that the decorating surface is covered;

Step b): clamping the plastic film arranged according to a) on the first tool part, while the mould is closed, by bringing together the first mould part and the second mould part;

Step c): allowing the molten plastic to enter the closed mould via the inlet in the second mould part;

Step d): after cooling, opening the mould and removing the moulded article.

In preferred embodiments of the process, the clamping according to step b) takes place simultaneously with mould closure. It can be provided that a fixing and/or a pretensioning of the plastic film arranged according to step a) on the first tool part takes place before step b).

BRIEF DESCRIPTION OF THE DRAWINGS

In the following description, the invention is explained in more detail with reference to figures.

There are shown in.

DETAILED DESCRIPTION OF THE INVENTION

Figure 1:
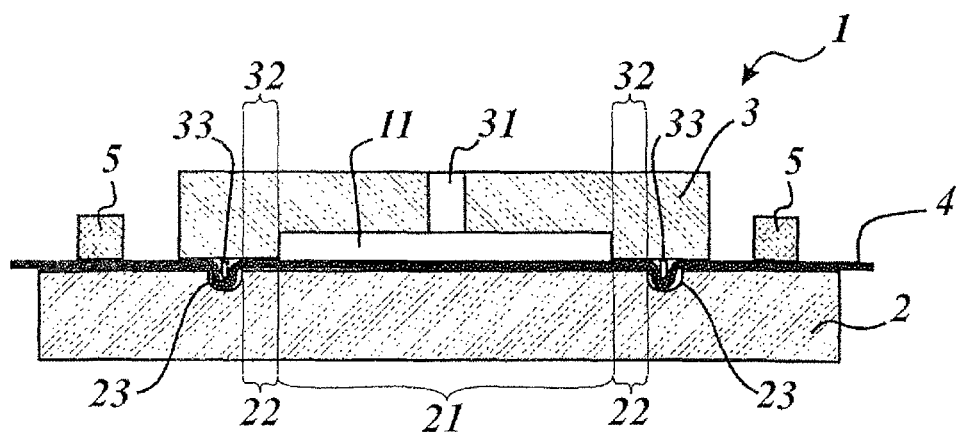
FIG. 1 a sectional view of a mould of a first embodiment example.

The mould 1 shown in FIG. 1 is assembled from two mould parts 2, 3. FIG. 1 shows the mould in the closed position before injecting the molten plastic. In FIG. 1, the plastic film to be back-injected 4 is arranged clamped between the mould parts 2, 3.

In the preferred embodiments shown in the figures, the plastic film 4 is of multilayer construction and has a support film, [consisting of] a thermoplastic film with a layer thickness between 6 µm and 300 µm, more preferably between 10 µm and 50 µm. The formulation of the support film is preferably selected such that the glass transition temperature of the support film is between 10 and 200° C., more preferably between 20 and 150° C. The support film preferably consists of PET, BOPP, PVC, PC, PET-PC, polypropylene (PP), ABS, ABS-PC, polystyrene, PMMA. The support film can be in the form of a single-layer material or a composite, e.g. as a laminate of several individual films and/or be coated with one or more coating layers. The coating layers can for example be adhesive layers or protective layers or layers for reducing the electrostatic charge of the support film.

Furthermore, the plastic film 4 has further layers that are arranged on the support film, in particular a heat activatable detachable layer for subsequent detachment of the support film from the rest of the stack of layers of the plastic film 4 remaining on the moulded article, a single-layer or multi-layer protective layer, a single-layer or multilayer decorative sheet and a heat activatable adhesive layer. The decorative sheet can have decorative layers, e.g. opaque, translucent or transparent coloured varnish layers, replicating varnish layers, reflective layers or metal layers and/or functional layers such as e.g. electrical conductors made of metal and/or conductive polymers, electronic components, optoelectronic components or photosensitive components. The detachable layer has in particular a layer thickness from 0.001 to 0.5 µm, the decorative sheet in particular a layer thickness from 0.1 to 50 µm and the adhesive layer in particular a layer thickness from 0.01 to 10 µm.

The decorative sheet can be patterned with a continuous pattern, wherein the precise position between pattern and moulded article is not important. The decorative sheet can also have a single image as pattern, which must be applied precisely positioned on the moulded article. For this it is necessary for the plastic film to be positioned correspondingly precisely on the decorating surface. This is achieved by means of so-called register marks on the plastic film which are detected by preferably optical sensors on the mould. The optical sensors control a transfer device for the plastic film, which transports the plastic film into the mould, preferably as continuous sheeting from a roll or also as single sheet.

Thermoplastic polymers, such as ABS, ABS-PC, polypropylene (PP), polycarbonate (PC), polystyrene, ABS-PC, PMMA, PET, PET-PC or also combinations of these materials are preferably used as molten plastic.

The mould 2—the lower mould in FIG. 1—has a decorating surface 21. The mould 3—the upper mould part in FIG. 1—has an inlet channel 31 for the molten plastic. A cavity 11 is formed between the surfaces of the two tool parts 2, 3 facing one another. This cavity 11 forms the mould cavity, i.e. the space in which the molten plastic injected via the inlet channel 31 is received, for forming the plastic moulded article therein with back-injection of the plastic film 4.

It is important that the plastic film to be back-injected 4, as shown in FIG. 1, is arranged clamped in the closed mould. For clamping the plastic film 4, a flat clamping surface 22 and a recessed channel 23 encircling the decorating surface 21 are formed on the lower tool part 2, as can be seen in the perspective representation in FIG. 3. The clamping surface 22 is formed as a strip-shaped surface which is formed directly adjoining the decorating surface 21 and surrounds the latter as a closed annular surface. The inner edge of this annular-shaped clamping surface 22 coincides directly with the outer edge of the decorating surface 21. The recessed channel 23 is formed on the outer edge of the clamping surface 22. It forms an encircling recessed channel 23 which encircles the entire outer edge of the clamping surface 22. The encircling recessed channel 23 thus forms the outer edge of the clamping surface 22. In this respect, reference may be made to the perspective representation in FIG. 3, which clearly shows the course of the recessed channel 23.

Figure 2:
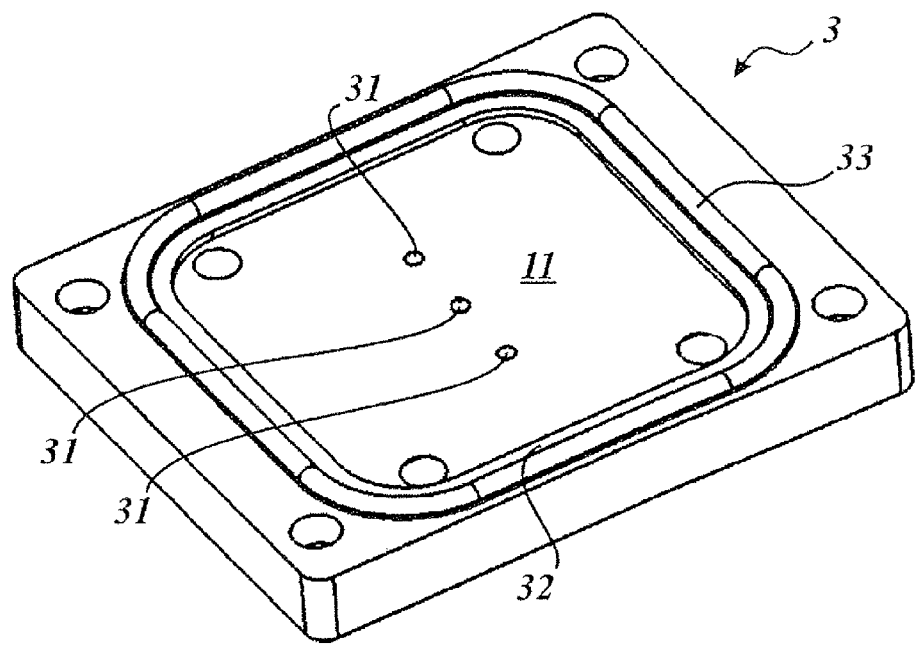
FIG. 2 a perspective view of the upper mould part in FIG. 1.

On the upper tool part 3, in the surface facing the lower tool part 2, an encircling flat clamping surface 32 is also formed in the manner of a closed ring. As clamping surface 32, it coincides with the clamping surface 22 of the lower tool part 2, i.e. in its dimensions and in its arrangement it is formed so that with the tool closed, the clamping surface 32 is arranged so that it is flush with and coincides with the clamping surface 22, wherein the plastic film to be back-injected 4 is interposed, i.e. is arranged between clamping surface 22 and clamping surface 32. The clamping surfaces 22 and 32 then lie flat on the underside or the upper side of the plastic film 4. This can be seen best in the sectional view in FIG. 1. It is important that in the upper tool part 3 on the outer edge of the clamping surface 32, an engaging bar 33 is arranged, with complementary engagement in the recessed channel 23 formed in the lower tool part 2. The engaging bar 33, which can also be seen in the perspective representation in FIG. 2, is formed as an encircling projecting bar which surrounds the annular clamping surface 32 in the same way in the manner of a closed ring, as the recessed channel 23 surrounds the annular clamping surface 22 and the decorating surface 22 arranged therein in the lower tool part 2. Owing to the coinciding arrangement, in the closed position of the tool the engagement of the engaging bar 33 in the recessed channel 23 shown in FIG. 1 results, wherein the interposed plastic film 4 is inserted by means of the engaging bar 33 into the recessed channel 23, i.e. is drawn in by the action of the engaging bar 33.

With precise positioning of the plastic film on the decorating surface it is advantageous if the plastic film 4 is acted on by recessed channel 23 and by engaging bar 33 within predetermined surface zones, in particular predetermined clamping zones. In these clamping zones the plastic film 4 can have different properties from those on the remaining area. For example, in the clamping zones, perforations can be provided in the plastic film 4, into which recessed channel 23 and engaging bar 33 engage, or the plastic film 4 has a different layer structure in the clamping zones, wherein either individual layers are removed, for example the adhesive layer, or further layers are additionally provided, for example bonding layers or nonstick layers or other functional layers, which improve the mechanical properties of the plastic film 4 for clamping.

As can be seen in FIG. 1, a fixing frame 5 placed on the plastic film 4 is arranged outside the encircling recessed channel 23 on the lower tool part 2. The fixing frame 5 has been omitted in the perspective drawings in FIGS. 2 and 3. It is preferably formed as an encircling fixing frame 5 which is arranged at a distance from the outer edge of the encircling recessed channel 23. It ensures that prior to closure of the tool, the plastic film 4 lies flat on the clamping surface 22 of the lower tool part 2 and is held in this position on the tool part 2. When the tool 1 is then closed so that it has the closed position shown in FIG. 1, the encircling engaging bar 33 of the upper tool part 3 engages with the encircling recessed channel 23 in the lower tool part 2. The plastic film 4 lying flat on the lower tool part 2 on the clamping surface 22 and held in place by the fixing frame is drawn into the region between engaging bar 33 and recessed channel 23, so that the plastic film 4 is clamped by the encircling clamping surface 22 and finally is arranged tensioned wrinkle-free and clamped flat in the closed position of the tool between the lower clamping surface 22 and the upper clamping surface 32. The plastic film 4 arranged between the clamping zones 22, 32 forms a seal of the mould 1 in the closed position.

The cavity 11 is formed by the hollow space formed between the two mould parts 2, 3 when mould 1 is closed. For this, in FIG. 1, the upper mould part 3 has a recess which is delimited by the inner edge of the upper clamping surface 32. As can be seen from FIGS. 2 and 3, this recess is essentially of rectangular parallelepiped shape. It has rounded corners in the lateral edges. The lower boundary of the cavity 11 is formed by the lower mould part 2. In FIG. 1, this lower boundary of the cavity 11 is the decorating surface 21 which is delimited by the inner edge of the lower clamping surface 22 and in the case of FIG. 1 is arranged flush in the same plane as the clamping surface 22.

The plastic film 4 positioned on the lower mould part 2 on the decorating surface 21, interposed between the mould parts 2 and 3, is back-injected with the molten plastic introduced via the inlet channel 31 in the injection operation. This means that the plastic moulded article that is formed in cavity 11 is decorated with the plastic film on the side facing the decorating surface 21. The plastic film can be a hot-embossed film or some other plastic film with or without support film.

After the cooling operation, the tool is opened and the plastic moulded article decorated with the plastic film 4 is removed. In the case of decoration with a transfer film, such as e.g. a hot-embossed film of a support film and a transfer sheet arranged detachably thereon or some other film with support film, during removal of the plastic moulded article the support film is detached from the transfer sheet adhering to the plastic moulded article.

Figure 3:
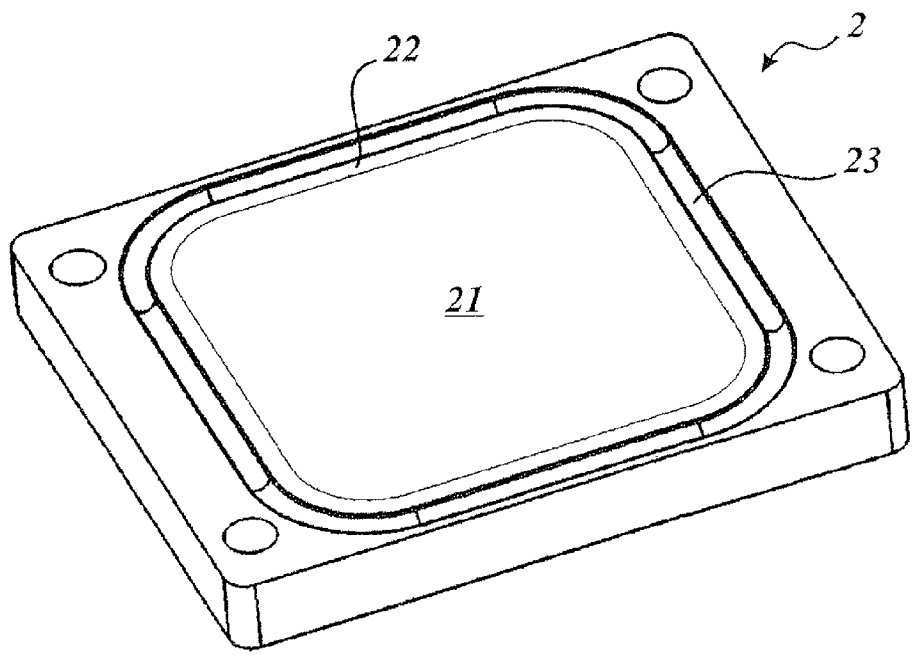
FIG. 3 a perspective view of the lower mould part in FIG. 1.
Figure 4:
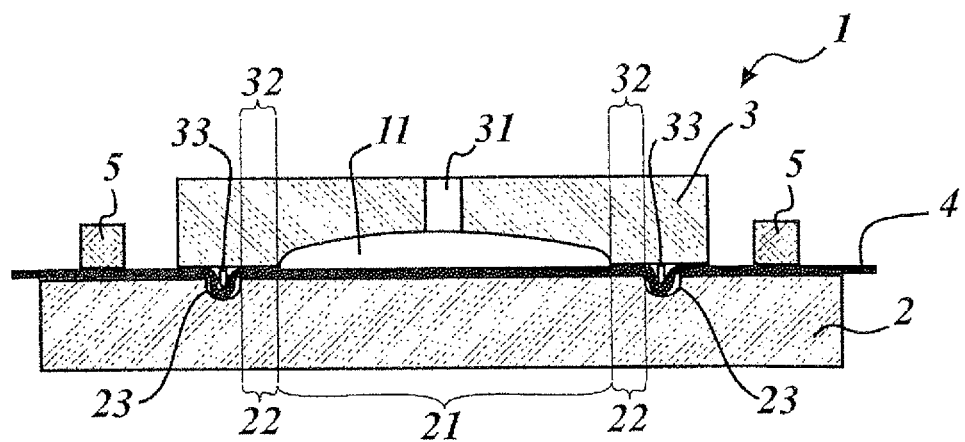
FIG. 4 a sectional view of a mould of a second embodiment example.

FIG. 4 shows a second embodiment example of a mould 1, which is a modification of the first embodiment example shown in FIGS. 1 to 3. These embodiment examples only differ in the configuration of the cavity 11. In FIG. 4, the recess formed in the upper tool part 3 has a concave upper inside wall, which however, as shown in FIG. 4, forms a right-angled edge with the plane of the clamping surface 32 just as in the embodiment example in FIG. 1, as the concave upper inside wall thus extends at a right angle into the flat underside.

Figure 5:
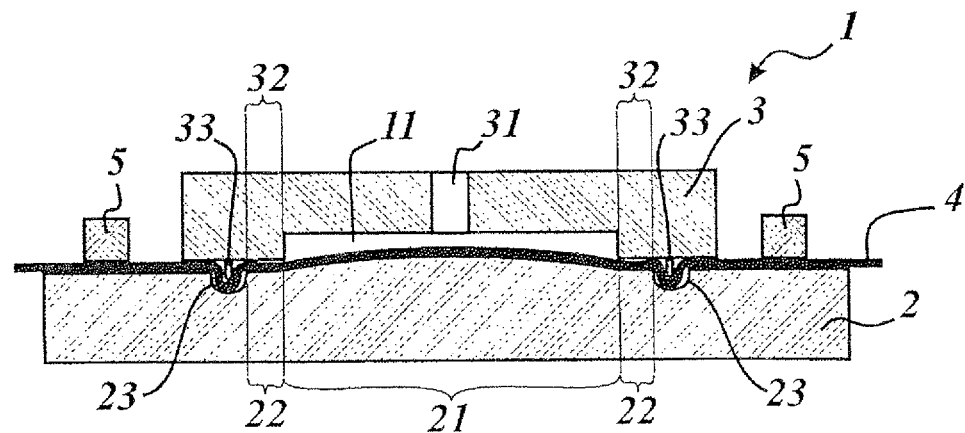
FIG. 5 a sectional view of a mould of a third embodiment example.

FIG. 5 shows a third embodiment example of a mould 1, which also only differs in the configuration of the cavity 11 from the first embodiment example as well as from the second embodiment example. The difference from the first embodiment example is that, in FIG. 5, the decorating surface 21, which forms the lower boundary of the cavity, is of convex shape. The outer edge of this convex decorating surface is directly contiguous with the inner edge of the flat clamping surface 22. In FIG. 5, the plastic film 4, which is tensioned when the tool is closed, lies on the convex decorating surface and is thus additionally tensioned.

Figure 6:
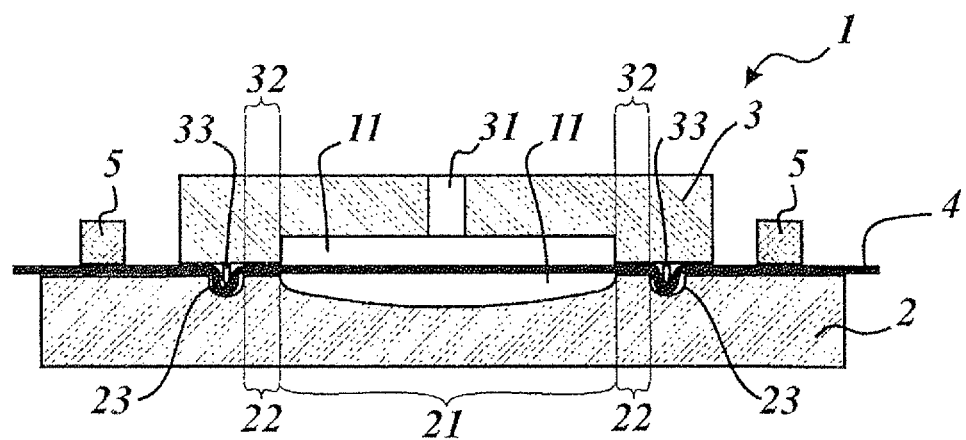
FIG. 6 a sectional view of a mould of a fourth embodiment example.

FIG. 6 shows a fourth embodiment example, which likewise is only modified relative to the preceding embodiment examples in the configuration of the cavity 11. In this case the difference from the first embodiment example in FIG. 1 is that the decorating surface 21 in the lower mould 2 is of concave shape, and indeed in such a way that the concave decorating surface 21, in the case shown, forms a right-angled edge with the plane of the clamping surface 22. In this case, with the mould closed, the tensioned plastic film 4, as shown in FIG. 6, does not lie on the decorating surface 21, but only its underside lies on the clamping surface 22 and it is clamped with a gap above the decorating surface 21. On the upper side of the plastic film 4 lying on the clamping surface 22, in the same way as in the embodiment examples in FIGS. 1 to 5, the upper clamping surface 32 of the upper mould 3 lies flat, forming a sealing zone, which seals the cavity between the mould parts 2, 3. When, in the injection operation, the molten plastic is introduced in FIG. 6 via the inlet channel 31, the plastic film 4 is softened by the molten plastic on the one hand by the high temperature of the molten plastic and on the other hand is moved towards the decorating surface 21, until the plastic film 4 lies flat on the decorating surface 21 and is further tensioned.

Figure 7:
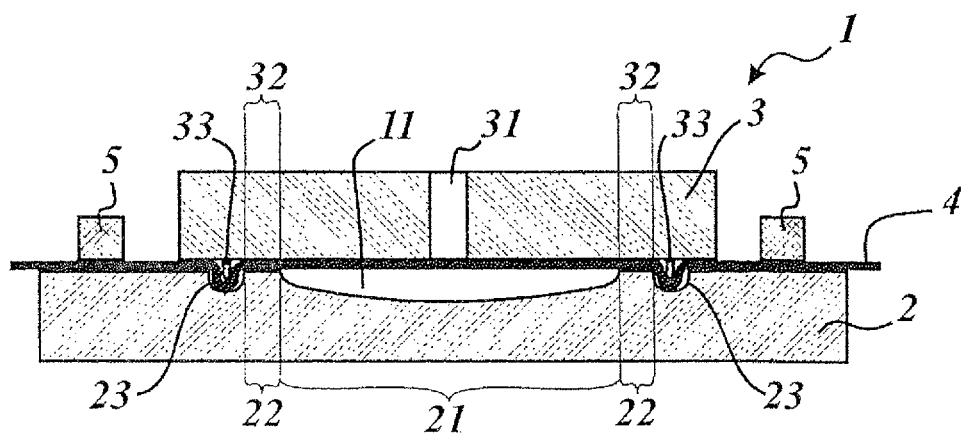
FIG. 7 a sectional view of a mould of a fifth embodiment example.

FIG. 7 shows a fifth modified embodiment example. In this case it is a modification of the embodiment example shown in FIG. 6. The difference from FIG. 6 is that no recess is formed in the upper mould part 3, but the upper boundary wall of the cavity is formed by the flat underside of the upper mould 3, wherein this flat underside is arranged flush in the plane of the upper clamping surface 32. When, in the injection operation, the molten plastic is admitted via the inlet channel 31 into the mould in FIG. 7, the molten plastic presses the plastic film 4, softened by the high temperature of the molten plastic in the same way as in the embodiment example in FIG. 6 onto the decorating surface 21 of the lower tool part 2, until the plastic film lies flat on the concave decorating surface.

The invention is summarized below:

Embodiments according to the invention make it possible to provide preferably flat plastic parts, i.e. plastic moulded articles, which are IM-decorated, wherein the decorating surface 21 can have a sharp rim or a sharp edge, which is decorated up to the rim or edge, preferably without a gap. It is possible to provide IM-decorated plastic parts that preferably have no rounding or no radius on their edges delimiting the decorating surface zone 21. Moreover, it is possible for these plastic parts to have no, preferably visible, seam or parting line. In particular, wrinkle-free decorated plastic parts can be produced.

Until now, freedom from wrinkles has been achieved in that the rim or the edge of the decorating surface zone had a small or extremely small edge radius, which no longer applies in the present invention. This edge radius had the effect that the molten plastic or injection moulding material itself, on flowing into the mould, drew the plastic film flat and pressed out any wrinkles. The molten plastic or injection moulding material acted practically like a doctor blade or a wedge and the edge radius caused a stretching of the plastic film within the mould. The stretching is necessary because the plastic film is heated during back-injection or inflow of the hot molten plastic or injection moulding material, i.e. it becomes soft and thereby expands, so that wrinkles can form. During forming of the plastic part, the plastic film is pulled into the edge radius and/or expands into the edge radius. In the embodiments according to the invention, however, it is no longer necessary to provide an edge radius, which causes a "funnel-like focusing" of the plastic film 4. Therefore the present invention makes it possible to provide more varied design of the edge shapes of the injected plastic parts. Thus, embodiments according to the invention can provide plastic parts that can be decorated more precisely than was possible previously.

Embodiments according to the invention in particular advantageously provide the constant tightening of the plastic film 4 before and during injection moulding, so that the plastic film 4 is wrinkle-free in the decorating surface zone 21. In this case, preferably a plastic receiving space, which is formed between the upper side of the first mould part 2 and the underside of the second mould part 3 in the decorating surface zone 21, in the region of the plane spanned by the clamping surface zone 22, thus in the decorating surface zone, is only slightly convex or concave, or is flat.

Embodiments according to the invention advantageously provide that the plastic film 4 is held in place under tension or is clamped by means of the engaging arrangement 33 and the recessed zone 23. Through the tensioning of the plastic film 4 by means of the engaging arrangement 33 and the recessed zone 23, the plastic film 4 can be deformed considerably. The clamping surface zone 22 prevents formation of wrinkles of the plastic film 4 in the decorating surface zone 21.

In a preferred embodiment according to the invention, the engaging arrangement 33 and the recessed zone 23 can act as pulling elements, because the engaging arrangement and the recessed zone "entrain" the plastic film during mould closure. Thus, the tension of the plastic film 4 can be increased during closure of mould 1. Moreover, during mould closure the plastic film 4 can be pulled flat.

In particular it is possible to arrange the engaging arrangement 33 and the recessed zone 23 in such a way that the tension of the plastic film 4 is independent of the contour shape of the decorating surface zone 21 and/or of the plastic receiving space 11. The tension of the plastic film 4 in this case preferably takes place from the centre of the decorating surface zone 21 and/or of the plastic receiving space 11. The plastic film 4 can thus be tensioned wrinkle-free uniformly in all directions over the entire decorating surface zone 21. Preferably the clamping surface zone 22 is adapted to the contour of the decorating surface zone 21.

LIST OF REFERENCE NUMBERS

1 mould
11 plastic receiving space
2 lower mould part
21 decorating surface zone
22 clamping surface zone
23 recessed zone
3 upper mould part
31 inlet
32 clamping surface zone
33 engaging arrangement
4 plastic film
5 fixing device

The invention claimed is:

1. A mold for back-injection of a plastic film with molten plastic, the mold comprising:
a first mold part having a decorating surface zone, a clamping surface zone arranged in the region of the outer edge of the decorating surface zone and a recessed zone arranged within the clamping surface zone or in an outer edge of the clamping surface zone or externally at a distance from the outer edge of the clamping surface zone;
a second mold part forming a cavity together with the first mold part; and
a fixing device, by which the plastic film to be back-injected can be held in place on the first mold part, lying on the clamping surface zone of the first mold part, prior to mold closure, the fixing device being formed by a transfer device of the plastic film or by a pressing device supported on the first or on the second mold part,
wherein the second mold part has an inlet for the molten plastic and a projecting zone, wherein the projecting zone of the second mold part is arranged so that the recessed zone of the first mold part and the projecting zone of the second mold part during tool closure form an interlocking engaging device, with which the interposed plastic film is clamped in the manner of a drawing operation and when the tool is closed, the projecting zone of the second mold part engages in the recessed zone of the first mold part, in order to hold the plastic film arranged between the first mold part and the second mold part, lying at least on the clamping surface zone of the first mold part, in the recessed zone of the first mold part under tension of the plastic film, and wherein the decorating surface zone is arranged in the same plane as the clamping surface zone of the first mold part.

2. A mold according to claim 1, wherein the clamping surface zone of the first mold part is arranged only in sections or completely surrounding the decorating surface zone.

3. A mold according to claim 1, wherein the clamping surface zone of the first mold part is formed as a strip-shaped surface.

4. A mold according to claim 1, wherein the recessed zone of the first mold part is arranged only in sections or completely surrounding the decorating surface zone and/or the clamping surface zone of the first mold part.

5. A mold according to claim 1, wherein the projecting zone of the second mold part is arranged so that it coincides with the recessed zone of the first mold part.

6. A mold according to claim 1, wherein the recessed zone of the first mold part is formed as recessed channel and the projecting zone in the second mold part is formed as complementary projecting bar.

7. A mold according to claim 1, wherein the second mold part has a clamping surface zone which is arranged, with the tool closed, to coincide with the clamping surface zone of the first mold part.

8. A mold according claim 1, wherein the fixing device surrounds the recessed zone of the first mold part at least on two opposite sides.

9. A mold according to claim 1, wherein the fixing device is arranged only in sections or completely surrounding the recessed zone of the first mold part.

10. A mold according to claim 1, wherein the first mold part forms, in the cavity, exclusively the decorating surface.

11. A mold according to claim 1, wherein the second mold part forms, in the cavity, a mold face, which forms, with the decorating surface, an angular edge, which is formed completely or largely without rounding.

12. A mold according to claim 1, wherein the second mold part forms, in the cavity, a mold face, which is contiguous with the decorating surface in a common aligned surface.

13. A mold according to claim 1, wherein the clamping surface zone of the first mold part and an opposing surface of the second mold part form sealing surfaces with interposed plastic film when the tool is closed.

14. A method for producing a plastic molded article which has a surface decorated with a plastic film, using a mold with a first mold part with decorating surface and a second mold part with inlet for the molten plastic, wherein the mold is formed according to claim 1, the method comprising:
arranging the plastic film on the first mold part such that the decorating surface is covered and fixing the plastic film that is arranged on the first tool part;
clamping the arranged plastic film on the first tool part, while the mold is closed, by bringing together the first mold part and the second mold part, wherein a projecting zone of the second mold part engages in a recessed zone of the first mold part and clamps the interposed plastic film by entrainment;
allowing the molten plastic to enter the closed mold via the inlet in the second mold part; and
after cooling, opening the mold and removing the molded article.

15. A method according to claim 14, wherein the clamping takes place simultaneously with mold closure.

16. A method according to claim 14, wherein a pretensioning of the arranged plastic film on the first tool part takes place the clamping of the arranged plastic film.

* * * * *